Feb. 26, 1924.

W. H. WELCH 1,485,351

MEANS FOR CONTROLLING THE SUPPLY OF HEAT IN VULCANIZING AND OTHER APPARATUS

Filed Jan. 16, 1923    2 Sheets-Sheet 1

Inventor
Walter H. Welch
by Wilkinson & Giusta
Attorneys.

Feb. 26, 1924.  1,485,351
W. H. WELCH
MEANS FOR CONTROLLING THE SUPPLY OF HEAT IN VULCANIZING AND OTHER APPARATUS
Filed Jan. 16, 1923   2 Sheets-Sheet 2
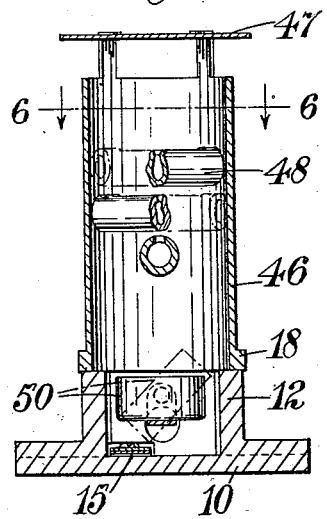
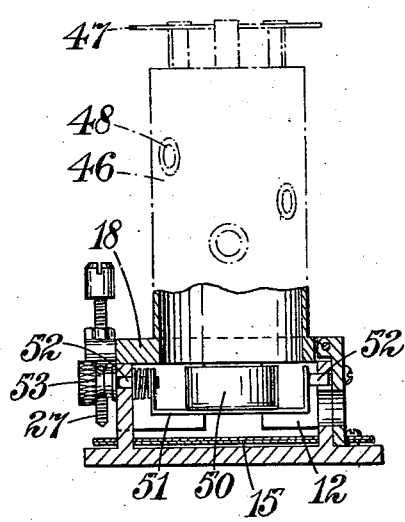
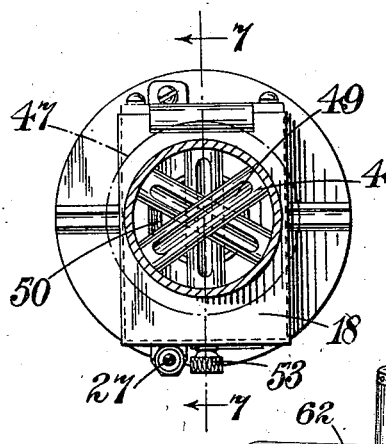
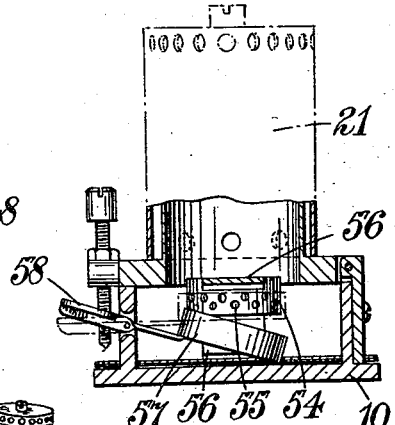
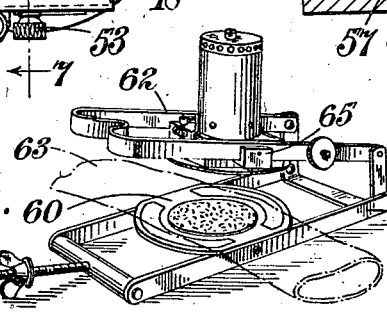
Inventor
Walter H. Welch
by Wilkinson & Giusta
Attorneys Patented Feb. 26, 1924.

UNITED STATES PATENT OFFICE.

1,485,351

WALTER HENRY WELCH, OF BRISTOL, ENGLAND, ASSIGNOR TO HARVEY FROST & COMPANY LIMITED, OF LONDON, ENGLAND, A BRITISH COMPANY.

MEANS FOR CONTROLLING THE SUPPLY OF HEAT IN VULCANIZING AND OTHER APPARATUS.

Application filed January 16, 1923. Serial No. 613,024.

*To all whom it may concern:*

Be it known that I, WALTER HENRY WELCH, a subject of the King of England, residing in Bishopston, Bristol, in the county of Gloucester, England, have invented certain new and useful Improvements in Means for Controlling the Supply of Heat in Vulcanizing and Other Apparatus, of which the following is a specification.

This invention is for an improved means for controlling the supply of heat to an apparatus or element which is to be heated, to regulate its temperature, or the time during which it is heated, or both these conditions. The invention may be applied to various kinds of apparatus, but is particularly suitable for use with vulcanizing apparatus, and such an application of it will hereinafter be described by way of example.

According to the present invention there is provided in a heating device the combination of a two-part heating-element whereof one part is arranged to be heated directly and the other is arranged to be heated conductively from the first, means for heating the said first part, and automatic means for introducing into the heat-conducting path between the two parts an element which is a poor conductor of heat and for varying the length of the said poor conductor so as to control the supply of heat to the conductively-heated part.

As applied to vulcanizing apparatus, this invention comprises the combination with a plate to be applied to the article to be vulcanized, of a heated element that is movable into contact with, or is normally in contact with, said plate, to heat it by conduction, and automatic means for separating said plate and said element to control the supply of heat to the plate. According to another feature of this invention, the said automatic means is actuated by or upon a predetermined rise in temperature of the plate, so as to constitute a thermostatic control; a convenient embodiment of the said automatic means comprises a bi-metallic strip secured on the plate and so arranged that when it moves due to an increase in temperature, it engages an abutment on the heated element, and lifts it away from the plate. Preferably the abutment is adjustable, comprising for example, a screw, or an eccentrically-mounted plate pivoted on the heated element and adjustable to bring different parts of it into position to be engaged by the bi-metallic strip aforesaid, said different parts being of different effective lengths between the bi-metallic strip and the pivot.

Other features of this invention relating to various details of construction will be hereinafter described with reference to certain specific embodiments of the invention, and the novel details pointed out in the claims.

In the accompanying drawings—

Figure 5 is an elevation in section of yet another modification;

Figure 6 is a plan in section on the line 6—6 of Figure 5;

Figure 7 is a side elevation partly in section on the line 7—7 of Figure 6;

Figure 8 is a part-sectional elevation of a vulcanizer similar to that illustrated in Figure 1 but embodying certain modifications, and Figure 9 is a pictorial view of a vulcanizer similar to that illustrated in Figure 1 mounted upon a portable clamp adapted for use in vulcanizing tyres.

Like reference characters indicate like parts throughout the drawings.

Figure 1:
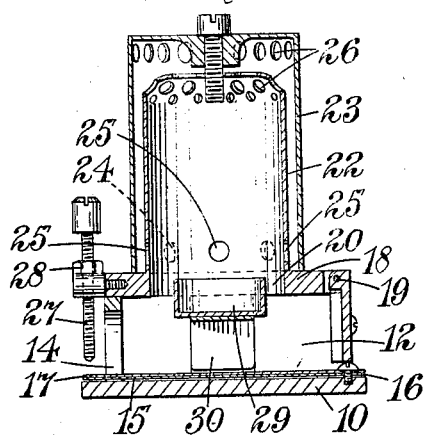
Figure 1 is an elevation in section of a vulcanizer.
Figure 2:
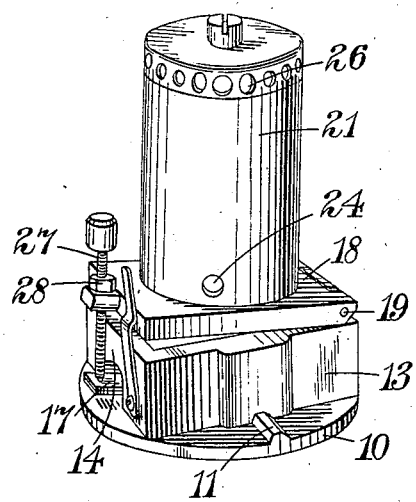
Figure 2 is a perspective view of the same.

Referring first to the construction illustrated in Figures 1 and 2, the vulcanizer comprises a plate-like member 10 which is shown as having a flat bottom suitable for use with the inner tubes of pneumatic tyres. It may, however, have any appropriate shape, according to the articles which are to be vulcanized. In use this plate is clamped on to the article that is to be vulcanized, and a bearing strip 11 to be engaged by the clamping member may be provided on the upper side of the plate. There is also provided on the upper side of the plate an open-topped chamber 12 (see Figure 1), whereof the walls 13, 14 are of a suitable thickness to provide a heat-conducting path of adequate cross-section to provide a sufficient supply of heat to the plate 10 by conduction. Preferably the plate 10 and the walls of the chamber 12 are made of a metal of high conductivity such as aluminium.

In any convenient position on top of the plate 10, conveniently within the chamber 12, there is mounted a bi-metallic strip 15; it is preferably fixed at one end 16, and is so arranged that the other free end 17 lifts upwards away from the plate 10, as shown in Figure 2, when the plate and strip become heated.

A cover 18 is provided for the top of the chamber 12, conveniently being hinged thereto as shown at 19. This cover comprises a plate which is of the same size as the outside dimensions of the chamber 12, and having its lower face so shaped, for example smooth and flat, as to be seated in close contact with the upper ends of the walls of the chamber to provide a good thermally-conducting path. A central hole 20 in the plate 18 is covered by a cylindrical member 21, as shown in Figure 1; this member 21 comprises inner and outer cylinders 22, 23 respectively, these being secured in any convenient manner to the plate 18, and to one another at the top if so desired. The outer cylinder 23 is provided near its lower end with air inlet holes 24, and the inner cylinder with air inlet holes 25, which are staggered with respect to the holes 24. Suitable outlet orifices 26 are provided at the tops of the two cylinders.

The hinge connection 19 aforesaid of the plate 18 is situated at the fixed end 16 of the strip 15 aforesaid, and opposite the free end 17 there is mounted on the plate 18 a screw 27 which lies in the path of movement of the said free end 17, and is adjustable towards or away from it to determine the temperature at which they become operative; any convenient means such as a nut 28 may be provided for locking the screw when adjusted.

Within the chamber 12 there is mounted a burner appropriate to the fuel which is to be used with this vulcanizer. In the construction illustrated, there is a cup-like member 29 supported above the plate 10 on a suitable bracket or stand 30, and this member is suitable for use with either solid or liquid fuel. The air for combustion is supplied through suitable openings in the walls of the chamber 12 and also through the openings 24, 25 aforesaid, and the products of combustion escape through the outlets 26.

In the operation of this device the fuel is placed in the cup 29 and ignited, and by its combustion it heats the cylindrical member 22. The annular air-space between the cylindrical members 22, 23, provides a sufficient lagging to prevent loss of heat from the cylinder, and the air entering through the orifices 24, 25 which are staggered with respect to one another, is preheated to a certain extent so that the combustion is not retarded. The heat thus received by the cylindrical member 22, and in a lesser degree by the outer cylindrical member 23, is conducted down to the plate 18 and thence down the walls of the chamber 12 to the plate 10, which is, as above stated, clamped upon the article to be vulcanized. The adjustable abutment 27 is so arranged with respect to the free end of the bi-metallic strip 17 that when the plate 10 has attained the temperature appropriate to the operation being carried out, it is engaged by the said strip which is bent upwards, and if this temperature is exceeded, the strip 15 presses upon the abutment 27 and lifts the plate 18 away from contact with the upper ends of the walls of the chamber 12 as shown in Figure 2. The interposition of an air-gap in the path along which the heat is conducted to the plate 10 causes an immediate diminution in the supply of heat, so that the plate 10 does not rise above the predetermined temperature. When it cools down, the strip 15 straightens out again and allows the plate 18 to come into contact with the walls of the chamber 12 and recommence the supply of heat at a greater rate.

It will be seen that by this method of controlling the supply of heat by the interposition of a length of poor thermal conductor, in the conducting path, there is no necessity to control the flame or rate of combustion of the fuel, and one of the serious difficulties of the thermostatic control of a flame-heated member is thereby obviated.

Whilst a construction of vulcanizer for the use of solid or liquid fuel has been described and illustrated, it is to be understood that the invention is not limited to such an arrangement, as any other source of heat may be used. Thus, for example, the cylinder 22, or an equivalent member, could be arranged to be electrically heated by winding a resistance coil upon it. The other parts of the apparatus, however, would be the same, and the operation would be similar to that hereinbefore described.

Figure 3:
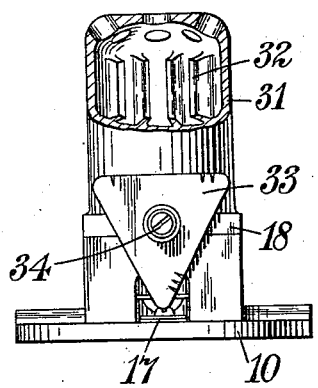
Figure 3 is an elevation partly in section of a modified construction of vulcanizer.

It is desirable to prevent any undue loss of heat by radiation from the heated element 21 of the vulcanizer, and one method of effecting this is to construct it in such manner that it has a considerable heat capacity. In the construction illustrated in Figures 1 and 2, the plate 18 is made of substantial thickness, and together with the cylindrical members 22, 23, is made of copper, or other metal which has a high specific heat and is also a good thermal conductor. A modified construction as illustrated in Figure 3 is one in which the heated element 31 of the vulcanizer is provided with internally-projecting ribs 32. These project into the path of the products of combustion from the flame, and receive heat therefrom, and since the mass of the whole element 31 is increased by their provision, its thermal storage capacity is also correspondingly increased. This figure also illustrates a modified construction of adjustable abutment. Upon the plate 18 there is pivotally mounted a triangularly or other appropriately shaped plate 33. The pivot pin 34 is situated at different distances from the points of the triangle, and the triangle can be rotated so as to bring any one of its points into the path of movement of the bi-metallic strip 17. That is to say, the distance between the bi-metallic strip and the abutment can be varied so as to produce the same adjustment as was effected by the screw 27 illustrated in Figure 1. The simple arrangement of a triangular plate provides three definite adjustments suitable for vulcanizing three different thicknesses of tyre. Obviously, however, any suitable shape can be used for the plate 33, according to the range and degree of adjustment which is desired.

Figure 4:
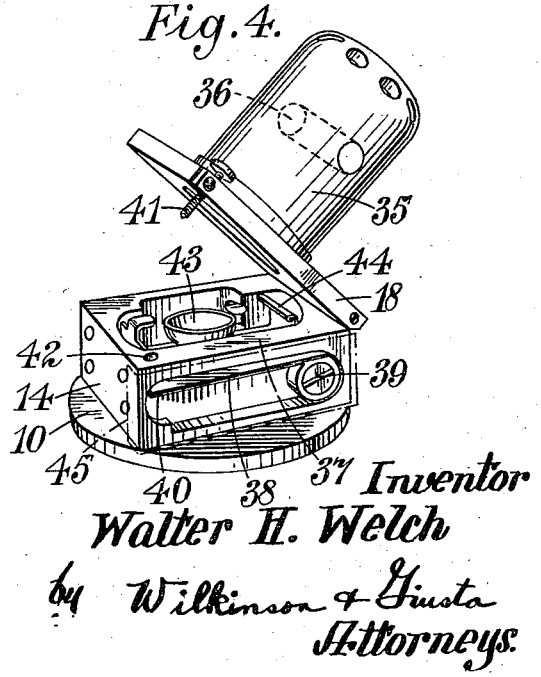
Figure 4 is a perspective view showing yet another modification.

Figure 4 illustrates yet another modified construction. The thermal capacity of the heated element 35 of the vulcanizer is increased by providing one or more rods or bars 36 extending across its interior. A different arrangement of the bi-metallic strip is also illustrated in this figure. Instead of being situated in the bottom of the chamber 12, one of the walls 37 thereof is provided with a pocket, and the strip 38 is mounted therein; it is fixed at one end 39 and so arranged that the other end 40 moves upwards when its temperature is raised. This end 40 co-operates with an adjustable screw 41 which is mounted in the plate 18 so as to extend through an opening 42 in the wall 37 aforesaid to engage the strip 38. A detachable cover-plate 45 is provided to enclose the pocket and strip 38. A modified arrangement of fuel container 43 is also shown in this figure, the cup 43 being mounted upon a strip 44 which is suitably shaped to provide for the easy handling of the cup.

Turning now to the construction illustrated in Figures 5, 6 and 7, the vulcanizer comprises a plate 10 and chamber 12 similar to those already described, but the heated element 46 consists of an open-ended cylinder having a cover 47 spaced away from the end of the cylinder to provide an exit for the products of combustion. The thermal capacity of this element is increased by providing a series of cross tubes 48 in it, as shown most clearly in Figures 5 and 6. These tubes 48 open through the wall of the cylinder 46, so that they can be used if desired as air-inlet passages. The tubes are slotted or otherwise open as shown at 49 in Figure 6, on their upper side; air entering at the ends of the tubes is preheated to a certain extent and escapes through the slots or openings 49 to mix with the products of combustion, and if necessary support combustion. The thermostatic control of this device is similar to that illustrated in Figures 1 and 2, but a different arrangement of burner is used. In order to accelerate the process of vulcanization, it is desirable to provide for a rapid initial heating of the heated element, and thereafter to reduce the rate of supply of heat to it. One means for effecting this in the case of solid fuel is illustrated in Figures 5, 6 and 7. A cup-like member 50, see Figures 5 and 7, corresponding to the cup 29 in Figure 1, is mounted on a bracket 51 which is pivoted at 52 in the walls of the chamber 12 and provided with an external milled head 53 or other convenient means for rotating the cup about its pivotal axis. When a piece of solid fuel placed in the cup is ignited, its rate of combustion depends on the facility with which air for combustion can approach it, and by rocking the cup about its pivotal axis into the position shown in chain lines in Figure 5, the supply of air is facilitated. More rapid combustion ensues and the whole device is rapidly heated. The cup may then be returned to its normal position to diminish the rate of combustion during the completion of the vulcanization. The operation of this construction of vulcanizer is in other respects similar to that hereinbefore described.

Figure 8 illustrates yet another modification, in which provision is made for varying the rate of combustion of the fuel. The plate 10 and heating element 21 with their thermostatic control are the same as those illustrated in Figures 1 and 2, but the burner device 54 is constituted by a cup having perforations 55 around it. This cup is supported on a bracket 56 in any convenient manner, and a shield-plate 57 is pivotally mounted or otherwise adjustable to cover the holes 55 aforesaid to a greater or less extent, thus controlling the rate at which air can reach the solid fuel. This shield 57 is preferably controlled by an external finger-piece 58.

The clamping device illustrated pictorially in Figure 9 needs no detailed description. It comprises a rigid tyre-supporting member in the form of a plate 60 attached to a rectangular frame 61, a clamping member in the form of a U shaped arm 62 hinged at one end to the frame 61 and capable of swinging down and clamping on the plate 60 the tyre, shown in dotted lines at 63, and the heating unit. The arm 62 is held in its operative position by means of a clamping screw 64. The arm is provided with rubber cheeks 65 which, when the arm is in operative position, frictionally engage the sides of the upstanding portion 13 of the heating unit, so that the latter may be conveniently lifted off from the tyre when hot.

It will be appreciated that whilst different arrangements and constructions of details have been described, as applied to different vulcanizers, the invention is not limited to such specific arrangements, and any of the details may be used, if appropriate with any of the vulcaniers; thus, for example, the triangular plate 33 may be used instead of the adjustable screw 27 in the construction illustrated in Figure 1, and so forth.

I claim:—

1. In a heating device, the combination of a two-part heating-element whereof one part is arranged to be heated directly and the other is arranged to be heated conductively from the first, means for heating the said first part, and automatic means for introducing into the heat-conducting path between the two parts an element which is a poor conductor of heat and for varying the length of the said poor conductor so as to control the supply of heat to the conductively-heated part.

2. In a heating unit for vulcanizing apparatus the combination of a two-part heating-element whereof one part is arranged to be heated directly and the other is adapted to be applied to the article to be vulcanized and is arranged to be heated conductively from the first mentioned part, means for heating the said first part, and automatic means for introducing into the heat-conducting path between the two parts an element which is a poor conductor of heat and for varying the length of the poor conductor so as to control the supply of heat to the conductively-heated part, substantially as set forth.

3. In a heating unit for vulcanizing apparatus, the combination of two separable elements whereof one is arranged to be heated directly and the other is adapted to be applied to the article to be vulcanized and is arranged to be heated conductively from the first by being normally in heat-conducting contact with it, means for heating said first element, and automatic means for separating the two elements to provide an air gap between their normally contacting surfaces so as to control the supply of heat from the one to the other substantially as set forth.

4. In a heating unit for vulcanizing apparatus the combination of two separable elements whereof the first is arranged to be heated directly and the second is adapted to be applied to the article to be vulcanized and is arranged to be heated conductively from the first by being in heat-conducting contact with it, means to heat the said first element, and means automatically actuated upon a predetermined rise in temperature of said second element to separate the elements and provide an air-gap between their normally contacting surfaces so as to control the supply of heat from the one to the other, substantially as set forth.

5. In a heating-unit for vulcanizing apparatus the combination of two separate elements whereof the first is arranged to be heated directly and the second is hinged to the said first, is adapted to be applied to the article to be vulcanized and is arranged to be heated conductively from the said first element by being normally in heat-conducting contact with it, means to heat said first element, and means automatically actuated upon a predetermined rise in temperature of the said second element to swing one element relatively to the other so as to control the supply of heat from the directly-heated element to the conductively-heated element substantially as set forth.

6. In a heating-unit for vulcanizing apparatus the combination of two separable elements whereof the first is arranged to be heated directly and the second is hinged to the said first, is adapted to be applied to the article to be vulcanized and is arranged to be heated conductively from the said first element by being normally in heat-conducting contact with it, means to heat said first element and a bi-metallic strip mounted rigidly at one end upon the conductively-heated element and arranged to contact at its free end with an abutment provided on the directly-heated element and to swing the latter out of contact with the conductively-heated element when the temperature therein rises above a predetermined degree, substantially as set forth.

7. In a heating-unit for vulcanizing apparatus the combination of two separable elements whereof the first is arranged to be heated directly and the second is hinged to the said first, is adapted to be applied to the article to be vulcanized and is arranged to be heated conductively from the said first element by being normally in heat-conducting contact with it, means to heat said first element and a bi-metallic strip mounted rigidly at one end upon the conductively-heated element and arranged to contact at its free end with an adjustable abutment provided on the directly-heated element and swing the latter out of contact with the conductively-heated element when the temperature therein rises above a predetermined degree corresponding to the adjustment of the abutment, substantially as set forth.

8. In a heating unit for vulcanizing apparatus the combination of two separable elements whereof one is adapted on one face to be applied to the article to be vulcanized and is formed on its opposite face with an open-topped chamber, and the other is hinged to the first-mentioned element and is arranged to lie in heat conducting contact with the end faces of the walls of the said chamber, a burner device situated within said chamber so as to directly heat said other element and conductively heat the first-mentioned element, and thermally-operated means for swinging the directly-heated element out of contact with the conductively-heated element when the temperature of the latter rises above a predetermined degree, substantially as set forth.

9. In a heating-unit for vulcanizing apparatus the combination of two separable elements whereof one is adapted on one face to be applied to the article to be vulcanized and is formed on its opposite face with an open-topped chamber and the other element is in the form of an open-bottomed chamber perforated near its upper end, is hinged to the first-mentioned element and is arranged to lie in heat-conducting contact with the end faces of the walls of the said chamber, a burner device situated within said chamber so as to directly heat the said other element and conductively heat the first-mentioned element, and thermally-operated means for swinging the directly-heated element out of contact with the conductively-heated element when the temperature in the latter rises above a predetermined degree, substantially as set forth.

10. In a heating-unit for vulcanizing apparatus the combination of an element to be applied by one face to the article to be vulcanized and formed on its opposite face with an open-topped chamber, a burner device situated within said chamber, a second element hinged to the first and constructed in the form of an open-bottomed chamber abutting the end faces of the walls of the open-topped chamber so as to be heated directly from said burner device and heat conductively the first-mentioned element, said open-bottomed chamber being provided with a gas outlet passage near its upper end and internal heat-storage baffles, and thermally-operated means for swinging the directly-heated element out of contact with the conductively-heated element when the temperature in the latter rises above a predetermined degree, substantially as set forth.

11. In a heating-unit for vulcanizing apparatus the combination of two separable elements whereof one is adapted to be applied to the article to be vulcanized and is formed on its rear face with an open-topped chamber and the other is in the form of an open-bottomed and air-jacketed chamber perforated near its upper end, is hinged to the first-mentioned element and is arranged to lie in heat-conducting contact with the end faces of the walls of the said chamber, a burner device situated within said chamber so as to directly heat the said other element and conductively heat the first-mentioned element, and thermally-operated means for swinging the directly-heated element out of contact with the conductively-heated element when the temperature in the latter rises above a predetermined degree, substantially as set forth.

12. In a heating-unit for vulcanizing apparatus the combination of two separable elements whereof one is adapted to be applied to the article to be vulcanized and is formed on its rear face with an open-topped chamber, and the other is in the form of an open-bottom and air-jacketed chamber, the inner and outer walls of which are perforated near the top and are also so perforated near the bottom as to permit the entrance of fresh-air into the interior of the chamber and into the space between the walls thereof, is hinged to the first-mentioned element and is arranged to lie in heat-conducting contact with the inner faces of the walls of said open-topped chamber, a burner device in the form of a cup-like container supported on the first-mentioned element centrally beneath said open-bottomed chamber so that fuel therein may directly heat the latter, a bi-metallic strip rigidly secured at one end to the hinged end of the first-mentioned element and extending therefrom towards the opposite end thereof so that it will curl upwardly under the action of heat, and an adjustable abutment provided on the said other element so situated as to be engaged by the free end of the said strip to swing the said other element out of contact with the first-mentioned element when the temperature in the latter rises above a predetermined degree corresponding to the adjustment of the abutment, substantially as and for the purpose described.

13. In a device for vulcanizing pneumatic tyres the combination of two separable elements whereof one is arranged to be heated directly, and the other is adapted to be applied to the article to be vulcanized and is arranged to be heated conductively from the first-mentioned element by being normally in heat-conducting contact with it, means to heat the first-mentioned element, thermally-operated means for moving the directly-heated element out of contact with the conductively-heated element when the temperature in the latter rises above a predetermined degree and a portable clamping device substantially as set forth.

14. In a device for vulcanizing pneumatic tyres the combination of two separable elements whereof one is arranged to be heated directly, and the other is adapted to be applied to the article to be vulcanized and is arranged to be heated conductively from the first-mentioned element by being normally in heat conducting contact with it, means to heat the first mentioned element, thermally-operated means for moving the directly-heated element out of contact with the conductively heated element when the temperature in the latter rises above a predetermined degree, a rigid tyre-supporting member, a clamping-member hinged to the supporting-member at one end and adapted to swing down and clamp the first mentioned element together with the tyre on to the supporting-member, and means to retain the said clamping-member in its operative position, substantially as set forth.

15. In a device for vulcanizing pneumatic tyres the combination of two separable elements whereof one is arranged to be heated directly, and the other is adapted to be applied to the article to be vulcanized and is arranged to be heated conductively from the first-mentioned element by being normally in heat conducting contact with it, means to heat the first said element, thermally-operated means for moving the directly-heated element out of contact with the conductively-heated element when the temperature in latter rises above a predetermined degree, a rigid tyre-supporting member, a clamping-member hinged to said supporting-member at one end and adapted to swing down and clamp the first-mentioned element together with the tyre on to the supporting-member, means to retain said clamping member in its operative position, and means for frictionally engaging the said clamping-member with an upstanding portion of the said first-mentioned part substantially as set forth.

In testimony whereof I affix my signature.

WALTER HENRY WELCH.